(12) United States Patent
Tingley et al.

(10) Patent No.: US 6,708,211 B1
(45) Date of Patent: Mar. 16, 2004

(54) WINDOWS FRAME, DIALOG BOX, KEYBOARD, DEVICE ACCESS AND USER ENVIRONMENT REAL TIME ASC FILE SIGNAL TRACKING AND CONTROL SYSTEM BASED UPON USER ACTIVITY

(75) Inventors: Margie A. Tingley, Dade City, FL (US); Robert F. Terry, Old Hicory, TN (US)

(73) Assignee: Evolutionary Vision Technology, Inc., San Antonio, FL (US)

( * ) Notice: Subject to any disclaimer, the term of this patent is extended or adjusted under 35 U.S.C. 154(b) by 0 days.

(21) Appl. No.: 09/422,888

(22) Filed: Oct. 21, 1999

Related U.S. Application Data
(60) Provisional application No. 60/105,258, filed on Oct. 22, 1998.

(51) Int. Cl.[7] .............................................. G06F 15/173
(52) U.S. Cl. ...................... 709/224; 709/227; 713/201; 705/11
(58) Field of Search .............................. 709/223, 227, 709/224

(56) References Cited

U.S. PATENT DOCUMENTS

| | | | |
|---|---|---|---|
| 5,557,742 A | | 9/1996 | Smaha et al. ................ 395/186 |
| 5,848,231 A | | 12/1998 | Teitelbaum et al. .......... 395/186 |
| 5,893,091 A | * | 4/1999 | Hunt et al. ..................... 707/10 |
| 5,964,839 A | * | 10/1999 | Johnson et al. .............. 702/187 |
| 6,047,261 A | * | 4/2000 | Siefert .......................... 702/182 |
| 6,125,390 A | * | 9/2000 | Touboul ....................... 709/223 |
| 6,351,771 B1 | * | 2/2002 | Craddock et al. ........... 709/227 |
| 6,408,391 B1 | * | 6/2002 | Huff et al. ................... 713/201 |

FOREIGN PATENT DOCUMENTS

| | | | | |
|---|---|---|---|---|
| EP | 0421409 A2 | 10/1990 | ............. | G07F/7/10 |
| WO | WO 96/41495 A | 12/1996 | ............. | H04Q/9/02 |
| WO | WO 97/50259 | 6/1997 | | |

OTHER PUBLICATIONS

PCT Invitation to Pay Additional Fees (including communication Relating to the Results of the Partial International Search) for PCT/US99/24801, priority date Oct. 21, 1998, date of mailing May 8, 2000.

* cited by examiner

*Primary Examiner*—David Wiley
*Assistant Examiner*—Phuoc H. Nguyen
(74) *Attorney, Agent, or Firm*—Fenwick & West LLP

(57) ABSTRACT

A method detects states that are activated by a user of a computer unit and includes: checking a set of values and/or characters in a memory area of the computer unit wherein each set of values correspond to a state activated by the user; and capturing each set of values to determine each state activated by the user. Each state corresponds to a Windows frame state and, alternatively, to a dialog box state.

6 Claims, 12 Drawing Sheets

| Year | Month | Day | Hour | Minute | Second | |
|------|-------|-----|------|--------|--------|---|
| 1999 | 09 | 09 | 06 | 03 | 01 | |

FIG. 9

WINDOWS FRAME, DIALOG BOX, KEYBOARD, DEVICE ACCESS AND USER ENVIRONMENT REAL TIME ASC FILE SIGNAL TRACKING AND CONTROL SYSTEM BASED UPON USER ACTIVITY

CROSS-REFERENCE TO RELATED APPLICATION

This application claims priority from U.S. Provisional Application No. 60/105,258, entitled "WINDOW FRAME AND DIALOG BOX TRACKING SYSTEM BASED ON THE USERS ACTIVITY", by Margie A. Tingley and Robert F. Terry, filed on Oct. 22, 1998, which U.S. Provisional Application No. 60/105,258 is fully incorporated herein by reference.

FIELD OF THE INVENTION

The present invention relates generally to the field of utility (operating system) application programming, and more particularly to a method for the real-time tracking, recording and controlling of the entire user environment with regards to Windows® frames and dialog boxes, keyboard and other devices (e.g., floppy drives or CD-ROMs), that are activated, initialized and/or utilized by an end-user of a computer unit.

BACKGROUND OF THE INVENTION

As the use of technology expands in businesses and organizations, there is an increasing need for management personnel to effectively track, record and control the use of company-owned technology. For example, it would be beneficial (optimum) if management personnel could track, record and maintain control of the use of company-owned computers in a real-time user environment. In a real-time environment, any misuse of company-owned technology would be terminated at the time a particular event is initialized by an end-user of a computer unit. For example, it would be beneficial to track, record and control the use of company-owned computer applications. It would also be beneficial to track, record and control all keyboard inputs in a computer keyboard. It would also be beneficial to track, record and control the use of all external devices (medias) used to copy data from one computer to another computer. The need to track, record and control the use of company-owned technology becomes more important as corporate and organizational structures become more virtual or fragmented. Furthermore, it may be beneficial for management personnel to have a real-time tool for monitoring access to its business computers, in order to collect data that helps in formulating policies or strategies that would benefit both corporations/organizations and employees.

Accordingly, there is a need for a real-time tracking tool that would permit management personnel to track, record and/or control the use of company-owned technology in a non-invasive manner. Furthermore, there is a need for a real-time tool that is easily implemented in and compatible with existing computer units and/or network equipment.

SUMMARY OF THE INVENTION

The present invention provides a real-time method of detecting states that are activated by a user of a computer unit, including: checking a set of characters and values in a memory area of the computer unit wherein each set of characters and values correspond to a state activated by the user; and capturing each set of characters and values to determine each state activated by the user. Each state corresponds to a Windows frame state or, alternatively, to a dialog box state. Alternatively, a state may correspond to a keyboard buffer state or to a device access state. Each set of captured characters and values may then be written in an ASCII text (ASC) command signal file that is transmitted, processed and stored in a storage device. The processed ASC command signal file may then be retrieved for further processing so that information relating to each state activated by the user may be viewed on a computer screen or stored in memory.

In one aspect of the present invention, the captured characters and values are written into a real-time ASC command signal file. The real-time ASC command signal file is then transmitted to a second computer unit that allows, for example, management personnel to view the current operations of all network users simultaneously and that allows for further processing so that information relating to each state activated by each network user may be viewed and further analyzed at a later date.

In another aspect of the present invention, the captured characters and values may be filtered (in real-time) in order to control (or limit) the PC environment state activated by a network user. Whether this PC environment state is a Windows frame, dialog box, keyboard input or device access, this real-time filter either allows the user to continue operations in the current state or terminates the state based upon a violation of the defined real-time filter.

The present invention captures all Windows frame, dialog box, keyboard input and device access activities in a real-time signal file communications environment, which is generated based upon the activity of the user of a computer unit. The present invention is compatible with various Windows operating systems and with network operating systems, and requires very minimal central processing unit (CPU) usage during operation. Additionally, the present invention is capable of running in a hidden mode to act as a non-invasive monitor, to track, record and/or control the Windows frame, dialog box, keyboard input and/or device access activities of the computer user.

BRIEF DESCRIPTION OF THE DRAWINGS

FIG. 9 is a diagram of a format of a keyboard ASC command signal file communications as the file is created and processed (transmitted) through the network;

DETAILED DESCRIPTION OF THE PREFERRED EMBODIMENTS

Figure 1:
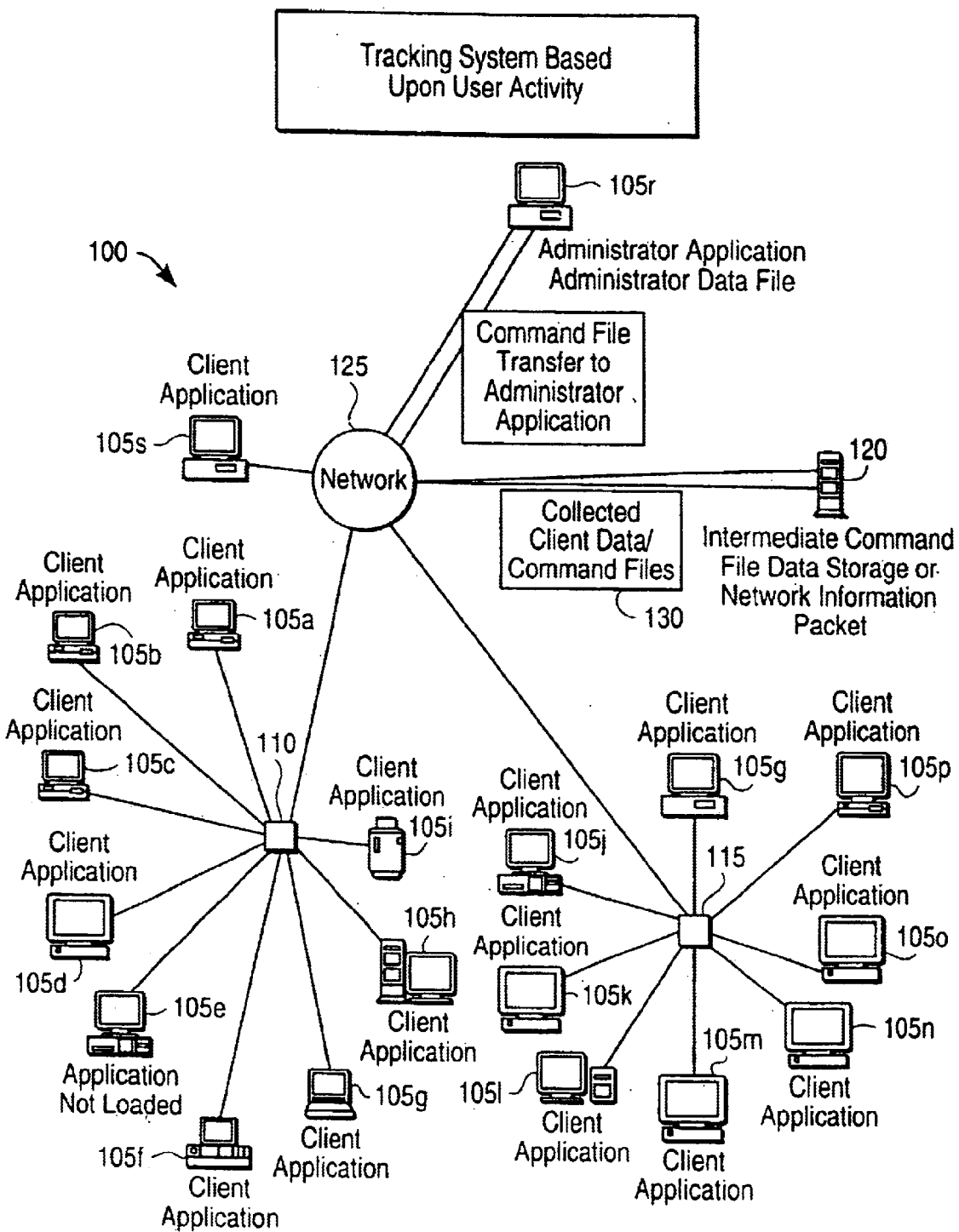
FIG. 1 is a block diagram of a network system for implementing the present invention.

Referring now to FIG. 1, there is shown an example of a network system 100 that can implement the present invention. The network system 100 includes a plurality of computer units (or workstations) 105a–105s. The computer units 105a–105s may include personal computers, workstations, notebook computers, and/or other suitable computing devices. As an example, the computer units 105a–105d, 105f–105q, and 105s each includes a client application in accordance with the present invention, while the computer unit 105e does not include a client application. However, any of the computer units in FIG. 1 may or may not be implemented with the client application.

In the example of FIG. 1, computer unit 105r includes an administrator application in accordance with the present invention. However, any other computer unit in FIG. 1 may also be implemented with the administrator application.

The computer units 105a–105i are coupled together by a wiring hub 110, while the computer units 105j–105q are coupled together by a wiring hub 115. The computer units 105r–105s and a command file storage device 120 are coupled together by a wiring hub 125.

The wiring hub 125 is coupled to both wiring hubs 110 and 115. Therefore, the computer unit 105a can, for example, send data via wiring hubs 110 and 125 to the computer 105r in a conventional manner. As another example, computer 105a can also send data via wiring hubs 110, 125 and 115 to the computer 105q.

A conventional network interface card or LAN adapter (not shown) is preferably implemented in each of the computer units 100a–100s for operating each computer unit within the network system 100. A network interface card serves as an interface between a given computer unit and the cables in the network system 100. A network interface card uses a specialized processor and routines to move data between the memory of the given computer unit and the network cable attached to the given computer unit.

The present invention tracks, records and controls all of the following activities initiated by user of a computer in the network system 100: all Windows frame and dialog box activities (or state changes), keyboard input activities, and device (e.g., floppy drive or CD-ROM) access activities. The present invention then communicates these events by real time ASC file signaling from a computer unit having the client application.

The client application of the present invention co-exists with the operating system of a computer unit and acts as a non-invasive user-activities monitor. As an example, assume an end-user of computer unit 105a has initialized a program with a particular Windows frame or dialog box in computer unit 105a. The client application in computer unit 105a will track each Windows frame or dialog box retrieved by the end-user. The client application records each detected Windows frame or dialog box activity (or state change) in a given ASC command signal file 130 and transmits this ASC command signal file to the administrator application. In one embodiment, the ASC command signal file is first stored in a designated destination such as a storage device 120 which includes a designated directory located on a defined public network physical drive. The client application also records each keyboard input (performed in computer unit 105a) in a given ASC command signal file 130 and transmits this signal file 130 to the administrator application for storage of the command signal file in device 105r. The client application also records each device access (performed in computer unit 105a) in a given ASC command signal file 130 and transmits this ASC command signal file 130 to the administrator application for storage of the ASC command signal file in device 105r. If an ASC command signal file is stored in the storage device 120, then the stored ASC command signal file may then be retrieved by the administrator application in computer unit 105r, as described below in additional details.

The administrator application in computer unit 105r collects all ASC command signal files 130, which are received by computer unit 105r. The received ASC command signal files 130 may be filtered so that only desired information is kept and stored in data files in a memory of computer unit 105r. The ASC command signal files 130 may also be seen on the display screen as data showing each Windows frame or dialog box retrieved by the end-user of computer unit 105a. Keyboard input activities or device access activities by a user of a computer unit in the network system 100 may also be recorded in an ASC command signal file 130 and seen on the display screen of computer unit 105r as data showing the particular keyboard input activities or device access activities of the user.

The other client applications in FIG. 1 can also track and record Windows frame and dialog box activities (or state changes), any keyboard input activities, and any device access activities that occur in their associated computer units. The administrator application in computer unit 105r can then receive the ASC command signal files 130 transmitted by the other client applications in FIG. 1.

Figure 2:
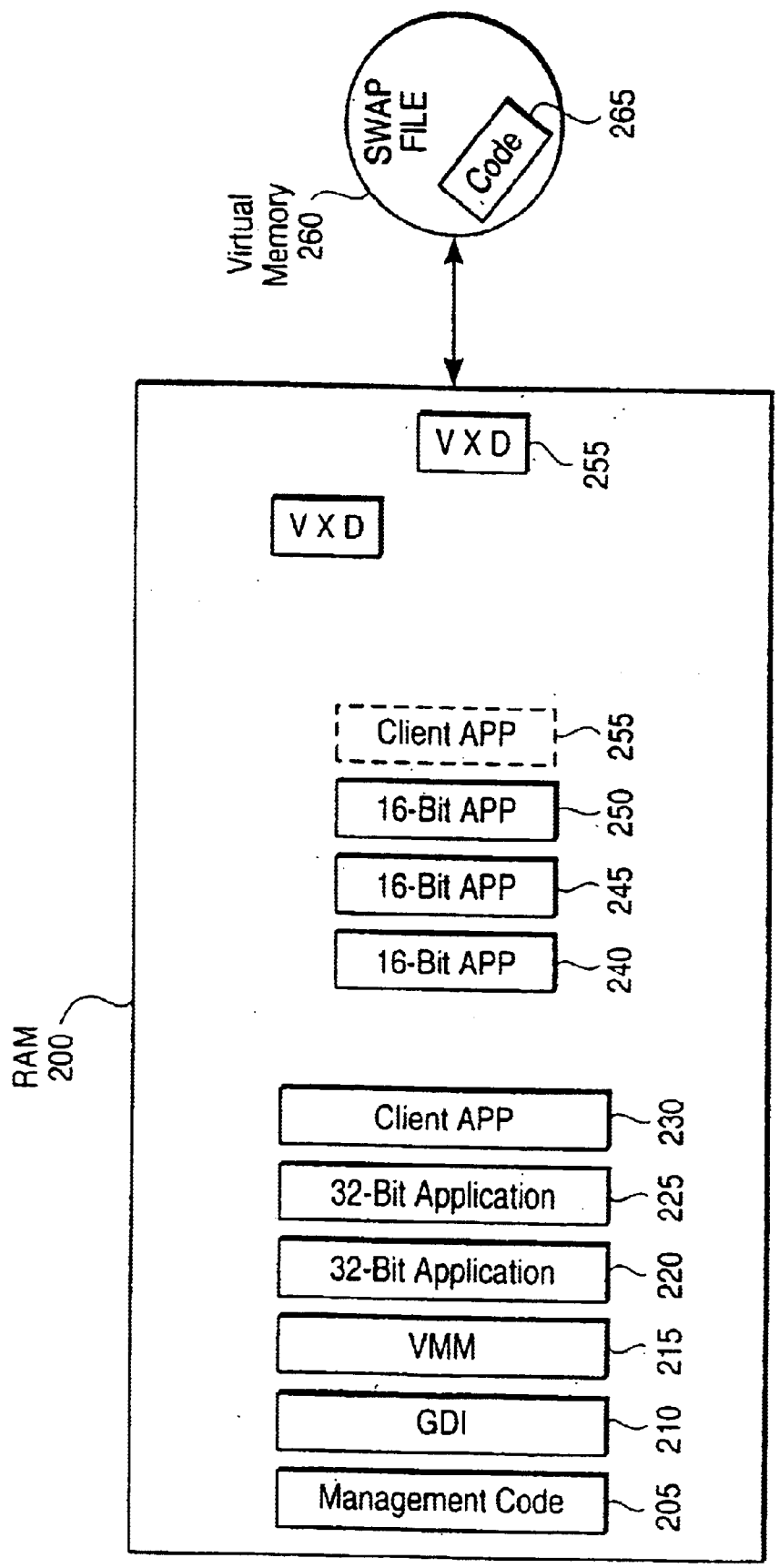
FIG. 2 is a block diagram of a computer memory stack illustrating the manner in which the operating system and programs access random memory, which is called "random access memory", in a computer unit that runs a client application in accordance with an embodiment of the present invention.

Referring now to FIG. 2, there is shown a random access memory (RAM) 200 which can be implemented in each of the computer units 100a–100q and 105s in FIG. 1. When a computer unit is turned on or reset, the code for a Windows operating system is loaded in different areas of RAM 200. A Windows application management code 205, Graphic Device Interface (GDI) code 210, and Virtual Machine Manager (VMM) code 215 are each loaded into separate memory spaces in RAM 200. The Windows application management code 205 is responsible for managing the Windows applications that run in the computer unit with RAM 200. The GDI code 210 is used for managing graphics applications. The VMM code 215 is the core Windows operating system code.

Other standard applications may be loaded in the RAM 200. For example, 32-bit Windows applications 220 and 225 may be loaded into separate memory spaces in RAM 200. Each 32-bit Windows application is assured use of a block of memory space in RAM 200.

A 32-bit client application 230 in accordance with the present invention may also be loaded in a separate memory space in RAM 200. Alternatively, a 16-bit client application 235 in accordance with the present invention may be loaded in another separate memory space in RAM 200.

As a further alternative, the client applications 230/235 may be loaded in other memory or disk areas that are accessible to the Windows operating system. The functionality of the client applications 230/235 is described below.

Standard 16-bit applications may also run in RAM 200. In the example of FIG. 2, the 16-bit applications 240, 245, and 250 are loaded in separate memory spaces in the RAM 200. However, if a cooperative multitasking procedure occurs, a particular 16-bit application may be required to give up the use of its memory space for use by another 16bit application.

If a given application needs to access a piece of hardware (e.g., a printer, display adapter or another device), the Windows operating system will load a 32-bit virtual device driver (VxD) 255 into RAM 200. Thus in a conventional manner, when the given application is finished accessing the hardware, a VxD is erased from RAM 200.

The Windows operating system can swap codes between the RAM 200 and a virtual memory 260. For example, if there is insufficient space in RAM 200 to match an application's request, then the Windows operating system can store (in virtual memory 260) a code that is currently stored in RAM 200 and that has not been recently used. In the example of FIG. 2, the application 265 is stored in the virtual memory 260. If, subsequently, the application 265 is required to run, then the Windows operating system may move another application from RAM 200 to virtual memory 260 and then move the application 265 from virtual memory 260 to RAM 200.

It is to be appreciated that the RAM 200 may have many other applications or modules only those applications necessary for an understanding of the present invention are shown in FIG. 2.

Figure 3:
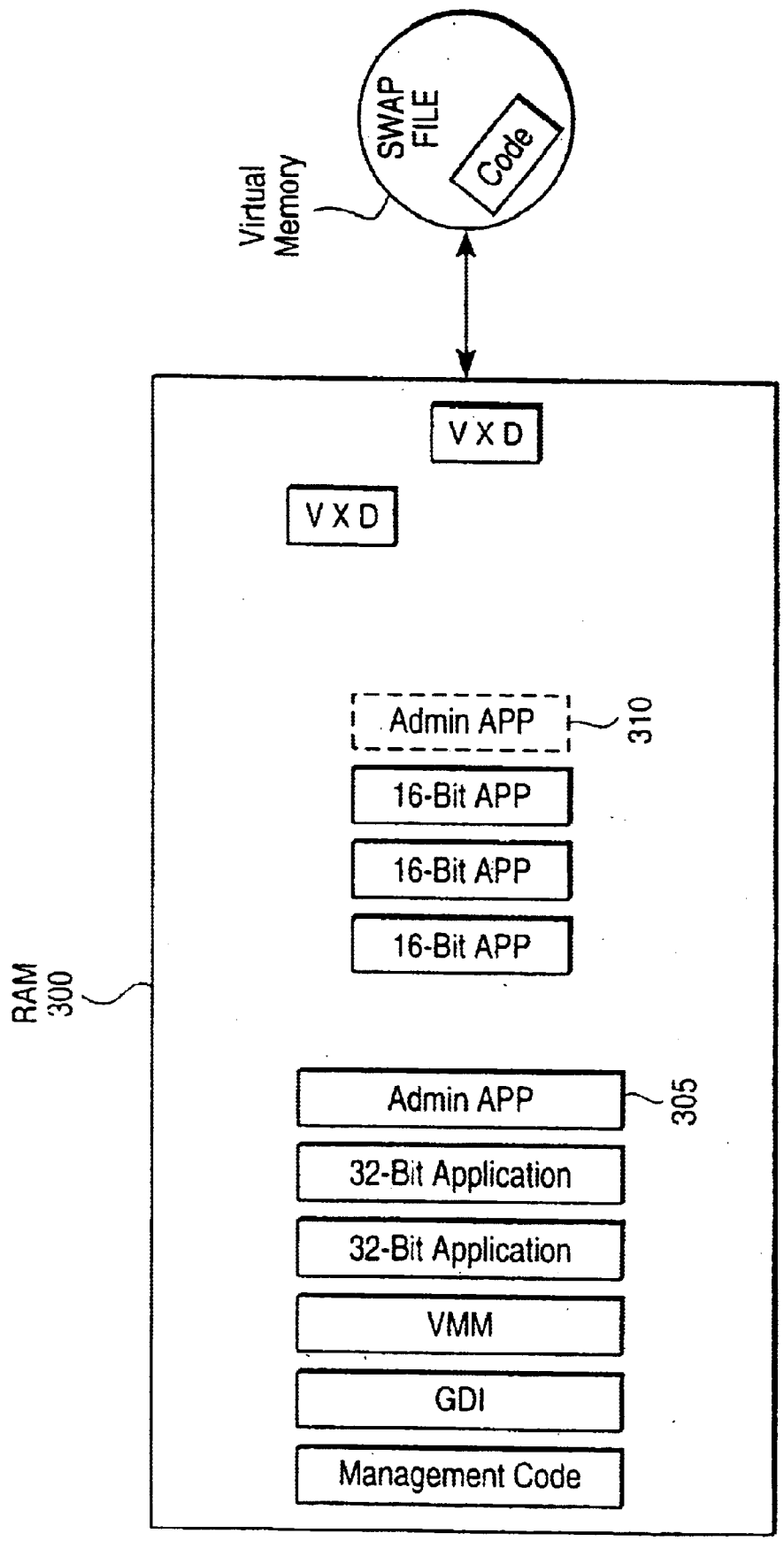
FIG. 3 is a block diagram of a random access memory in a computer unit that runs an administrator application in accordance with an embodiment of the present invention.

FIG. 3 shows a RAM 300 that is included in, for example, the computer unit 105r in FIG. 1. The RAM 300 is used by a Windows operating system that is implemented in the computer unit 105r. The RAM 300 may be loaded with codes that are similar to those codes described in FIG. 2. A 32-bit administrator application 305 in accordance with the present invention may be loaded in a separate memory space in RAM 300. Alternatively, a 16-bit administrator application 310 in accordance with the present invention may be loaded in RAM 300.

As a further alternative, the administrator application 305/310 may be loaded in other memory or disk areas that are accessible to the Windows operating system. The functionality of the administrator application 305/310 is described below.

Figure 4:
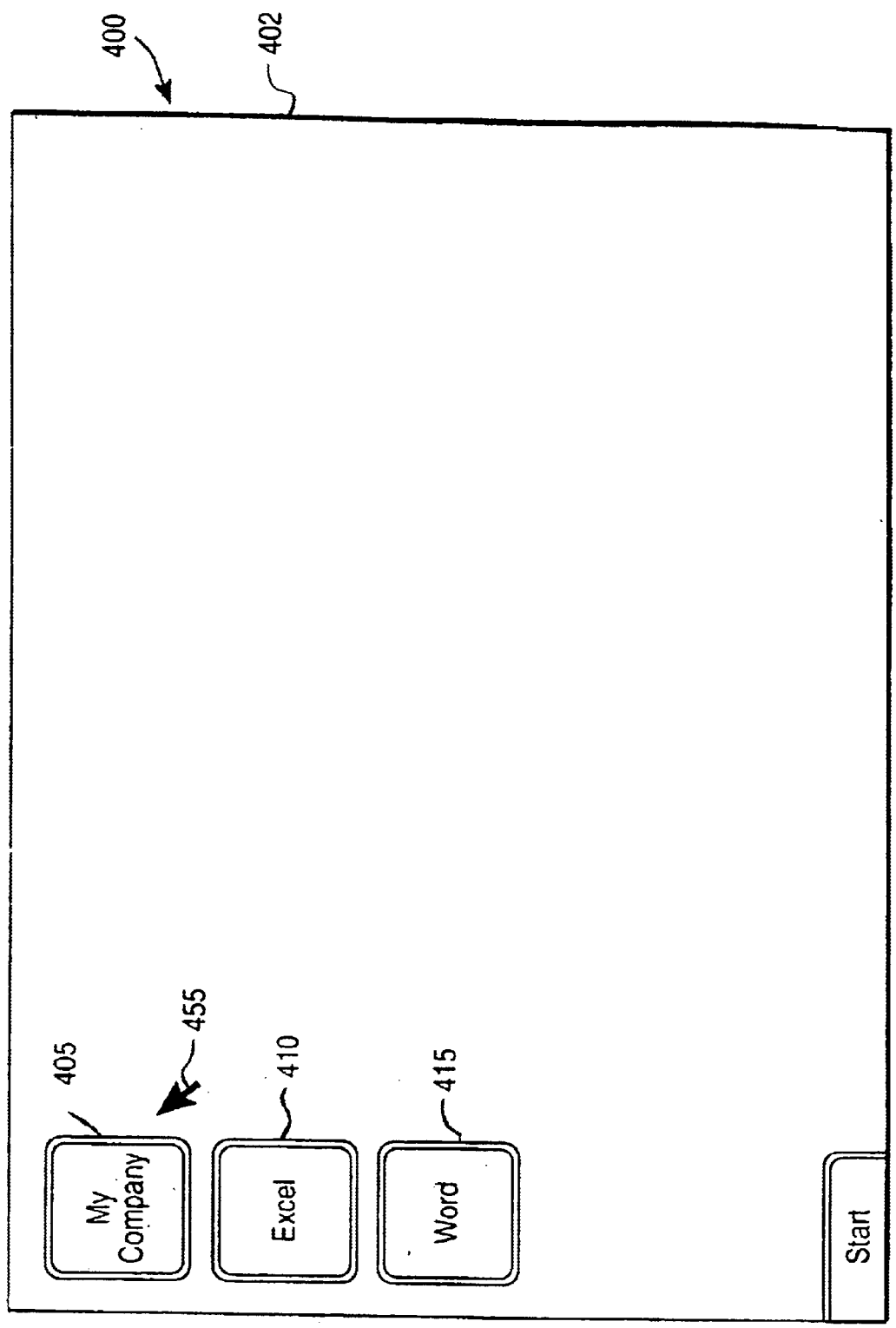
FIG. 4 is a diagram of a display on a computer unit for purposes of describing the functionality of the present invention.

FIG. 4 shows a diagram of a typical computer unit and the screen choice 400 of applications that a user can initialize and utilize in the computer unit. As the user initializes an application, the operating system registers the main Windows frame 402 or dialog box name into a reserved memory buffer within the operating system. This memory buffer contains a listing of all active Windows frames and dialog boxes, and this listing is known as the "Z" order. The "Z" order is the priority listing, in terms of which Windows frame or dialog box has the immediate focus of the user. The main (desktop) Windows frame 402 covers the entire display screen 400 and is always at the bottom priority of the "Z" order; thus the frame 402 is always behind all other Windows frames or dialog boxed subsequently activated by the user of the computer unit.

Once the user initializes an application or several applications, the user can randomly choose the particular Windows frame or dialog box that he/she needs to set as the operating system priority (i.e., set as the focus), by placing the mouse on the Windows frame or dialog box of choice and depressing the mouse key. Once this occurs, the operating system is notified that the user has selected a particular Windows frame or dialog box and the priority (focus), and is re-set to that Windows frame or dialog box. The "Z" order is modified, thus bringing that particular user-selected Windows frame or dialog box to the top priority of the "Z" order listing.

The "Z" order listing is accessed via Microsoft Foundation Class (MFC) and the information is placed into a virtual character memory buffer within the client application.

According to one preferred embodiment, the client application 230/235 is a utility application designed and developed within the Microsoft Visual C++ Development Environment. The client application 230/235 can access the conventional Windows operating system information through a fully re-usable C++ library conventionally known as the MFC. The MFC hides the fundamental application programming interfaces (API) that a programmer would normally use and provides an abstract development layer that allows a programmer to design/develop a Microsoft Windows multithreaded utility application without knowing the exact details of each native independent API within the Microsoft Windows Operating System. Otherwise stated, the MFC is a "grouping" of APIs that make software design and development easier for a programmer.

Figure 5:
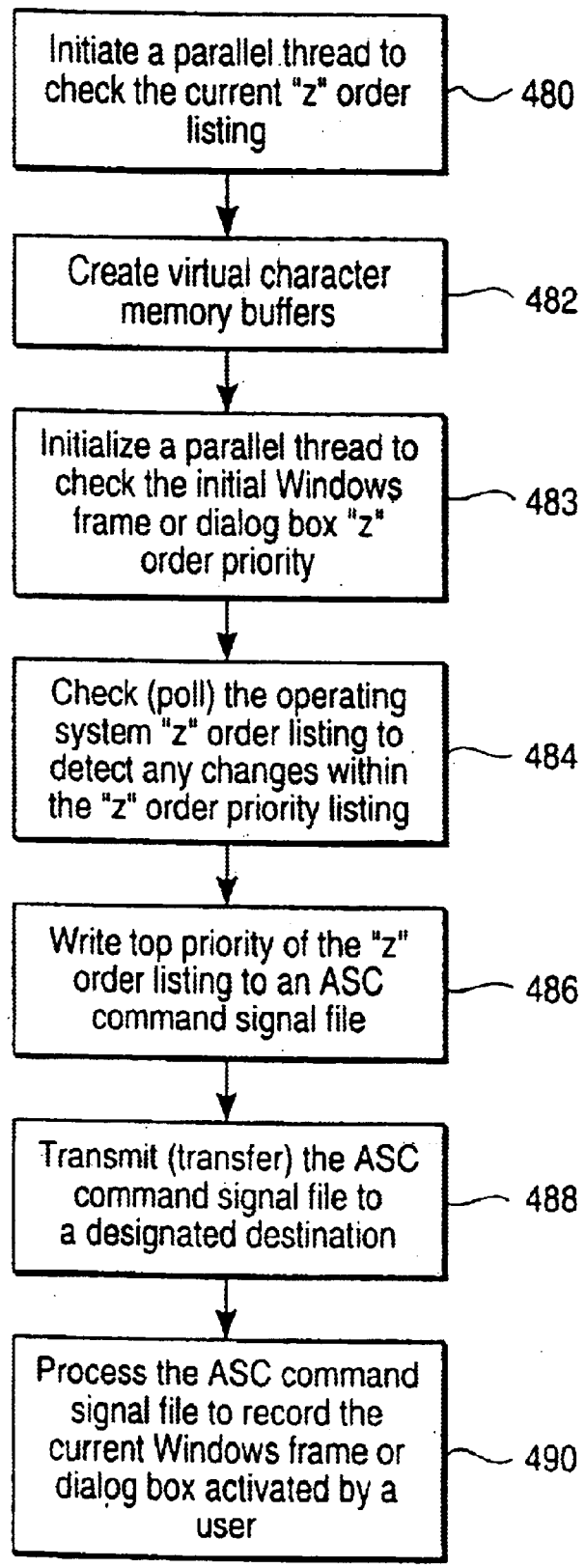
FIG. 5 is flowchart diagram illustrating a method of tracking Windows frame or dialog box activities in accordance with an embodiment of the present invention.

Reference is now made to the flowchart diagram in FIG. 5 for purposes of discussing the functionality of the client application in accordance with an embodiment of the present invention. As described in detail below, a parallel thread function will poll the operating system virtual memory in order to check for changes in characters due to a Windows frame or dialog box activity initiated by the user of a computer unit with the client application.

The client application initiates an MFC Class, which is referred to as Windows States. This MFC Class allows the client application to initiate 480 a parallel thread (polling routine) which executes an operating system (API) function to consistently check the current "Z" order listing, and which returns a list of Windows frame and/or dialog boxes that are currently active within the operating system. The methods used herein rely on the prescribed methods which Microsoft Corporation utilizes to monitor their own operating system (i.e., Windows). These prescribed methods are commercially available for use. Polling threads are described in Microsoft Foundation Class Library Reference, Version 4, part one, volumes 3 and 4, (published by Microsoft Press, 1995).

A "Z" order listing is always present within a reserved memory buffer within the operating system. The MFC Windows State class function (API), which retrieves the operating system "Z" order listing, allows the client application to create 482 it's own virtual character memory buffer and pass this virtual character memory buffer as a parameter within the calling MFC Windows State class (API) function.

The client virtual character memory buffer is populated with the current Windows frame or dialog box character name, which has the current top priority of the "Z" order listing.

Within the specific mechanics of the client application, a series of virtual character memory buffers are initialized within virtual memory, and a parallel thread is initialized 483 to check the initial Windows frame or dialog box "Z"

order priority. Once the virtual character memory buffers and the parallel thread have been initialized, the parallel thread polls 484 the operating system "Z" order, for example, every approximately 0.20 seconds to detect any changes within the "Z" order priority listing.

From the initial execution 483 of the parallel thread to the parallel thread polling 484, a recording of the top priority of the "Z" order Windows frame or dialog box listing is written 486 to an ASC command signal file 130 (FIG. 1). This ASC command signal file 130 is created by a secondary function initiated by the parallel thread and is transmitted (transferred) 488 from the client application to a designated destination such as a designated network directory physically located on the public network disk drive. When the parallel thread identifies any character change within the virtual character memory buffers, this memory buffer is transferred into a public memory buffer which is passed to the secondary function, which formats the memory buffer into an ASC stream followed by an ASC "carriage return" and an ASC "line feed". The secondary function then checks the designated network directory located on the public network disk drive for a previous ASC command signal file sent from the computer unit with the client application. If an ASC command signal file is present, it will be identified by a non-duplicated file suffix generated by the computer unit. If the ASC command file is present, the memory buffer will be stored in a memory array matrix (in the client application) and written to the designated network directory when the previous ASC command file clears the public network disc drive. If the ASC command file is not present, the secondary function will check a memory array matrix for previous records, write these records and the current record (memory buffer) to the designated network directory located on the public network disk drive.

This ASC command signal file 130 (FIG. 1), which has been transferred to the public network disk drive, is then processed 490 by the administrative application and is recorded in the administrative application as the current Windows frame or dialog box activated by the user of a computer unit with the client application.

An ASC command signal file 130 (FIG. 1) is generated and transmitted from the client application at the time of the initial recording of the top priority Windows frame or dialog box (as listed within the "Z" order) and every time the top priority Windows frame or dialog box changes within the "Z" order.

Figure 6:
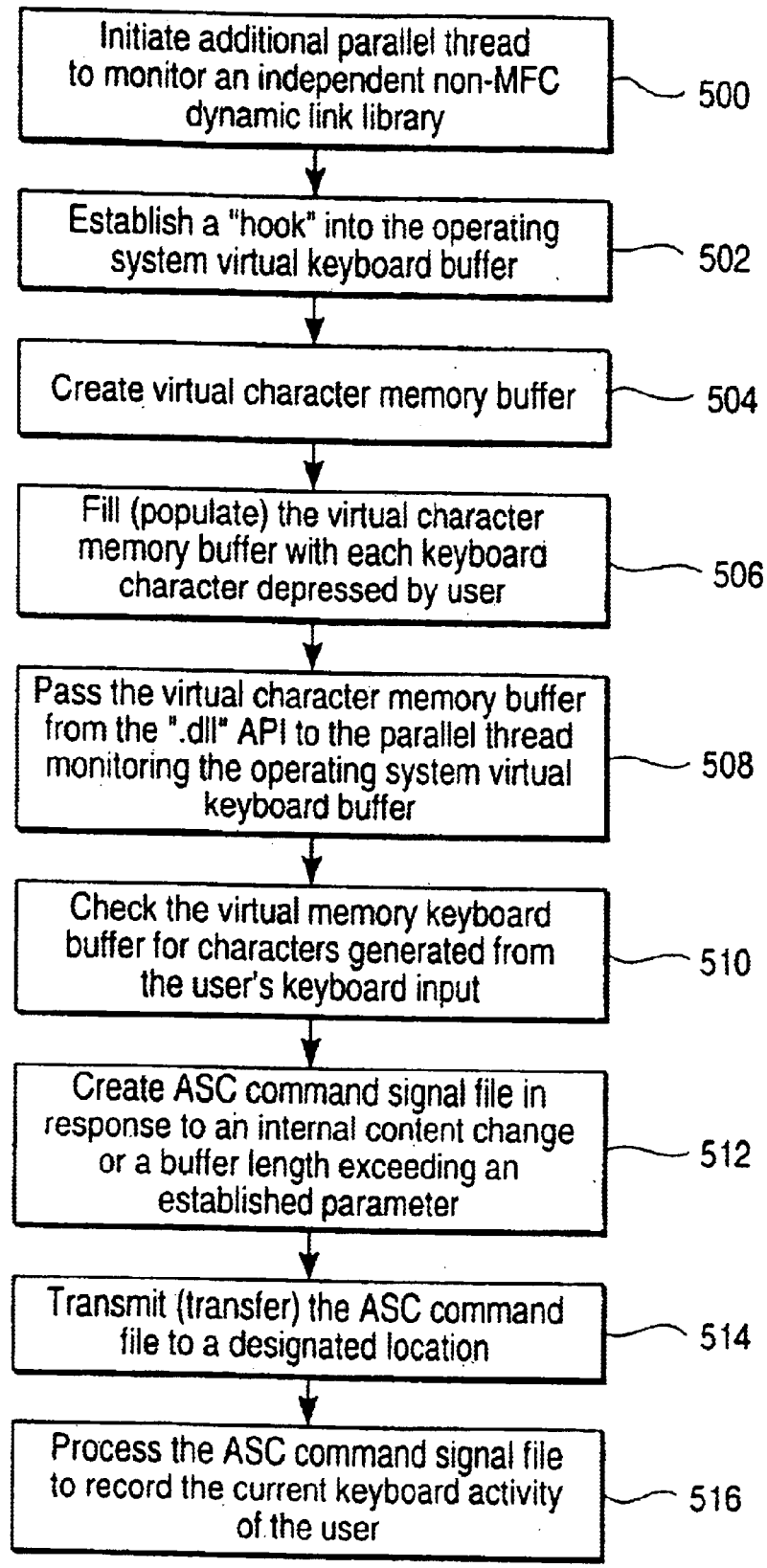
FIG. 6 is flowchart diagram illustrating a method of tracking keyboard input activities in accordance with an embodiment of the present invention.

Reference is now made to the flowchart diagram in FIG. 6 to further describe other features of the client application in accordance with an embodiment of the present invention. The client application initiates 500 an additional parallel thread, which monitors an independent Non-MFC dynamic link library ".dll" API, which establishes 502 a "hook" into the operating system virtual keyboard buffer. This API "hook" allows the client application ".dll" API to create 504 it's own virtual character memory buffer and pass this virtual character memory buffer as a parameter within the calling ".dll" API function.

A Windows "hook" is a method of writing a program which loads into memory and gathers operating system messages. The Windows operating system has thousands of "type definition structures". These structures, which are known within the "C" programming language as "struct" are a series of classes, which store one or more data types (buffers memory variables), which can be retrieved from the operating system. A 32 bit "Non-MFC" ".dll" is initialized which in turn, calls an operating system API function that initializes the keyboard API function, which starts the "hook". When the "hook" is initialized, it passes a parameter to the operating system API, and this parameter is an identifier (Windows ID—an permanent ID of the Windows operating system) that instructs the operating system to return all keyboard information to this "hook" (the ".dll"). The "hook", in turn, passes this information back to the client application via inter process communications or utilizing Windows messaging. This information, is then processed by the main parallel thread which is monitoring all keyboard traffic.

As the user initiates a keyboard input (i.e., depresses the key), the virtual character memory buffer is populated with each keyboard character depressed by the user (step 504). This virtual character memory buffer is passed 508 from the ".ddl" API into the client application parallel thread monitoring the operating system virtual keyboard buffer.

This parallel thread, which monitors the keyboard buffer, initiates an internal function which checks 510 the virtual memory keyboard buffer for characters generated from the user's keyboard input. The buffer is analyzed for it's internal content change and it's maximum length. Any change within the keyboard buffer or a buffer length exceeding a maximum established parameter generates an internal function which creates 512 an ASC command signal file which is transmitted (transferred) 514 to a designated location such as a designated network directory physically located on the public network disk drive.

The ASC command signal file, which has been transferred to the public network disk drive is then processed 516 by the administrative application and is recorded in the administrative application as the current keyboard activity by the user of a computer unit with the client application.

As the user continues keyboard input within the client application, ASC command signal files are transmitted (transferred) to a designated network directory physically located on the network public disk drive. The ASC command signal file is then processed by the administrative application. As the keyboard data changes, the data is transferred and stored within the administrative application from active to historical data, to be viewed or analyzed by the administrative application at a later date.

Figure 7:
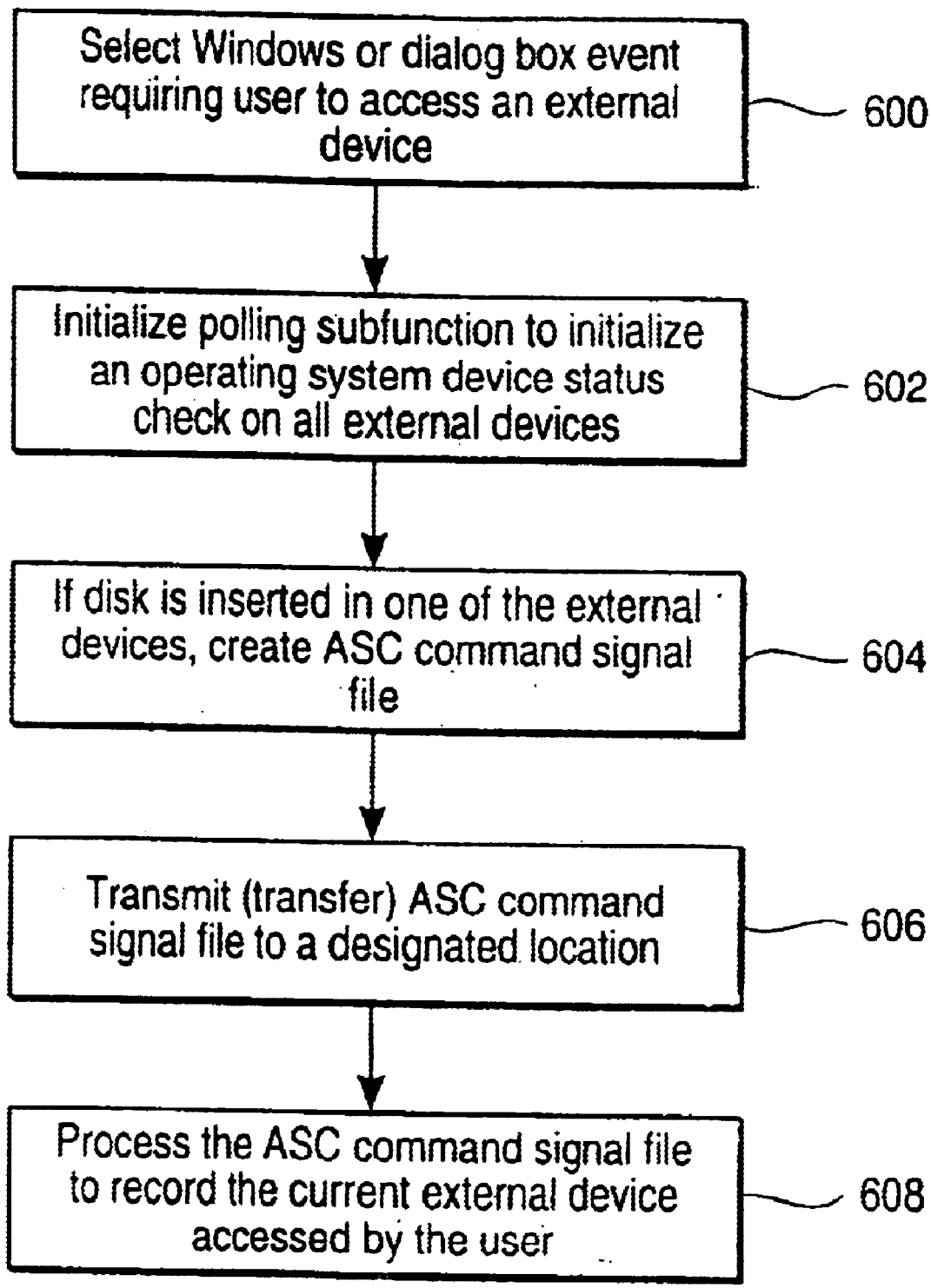
FIG. 7 is flowchart diagram illustrating a method of tracking device access activities in accordance with an embodiment of the present invention.

Reference is now made to the flowchart diagram in FIG. 7 for purposes of describing other features of the client application in accordance with an embodiment of the present invention. As stated above, the initial polling routine (parallel thread) executes the operating system (API) function, which returns the virtual memory character buffer of the top priority Windows frame or dialog box within the "Z" order. The polling routine calls an additional function to analyze the specific device access activity of the user. If the user has activated a Windows frame or dialog box which may require the user to access a particular device such as the "A:" drive or a CD-ROM, an ASC command signal file 130 will be created by this function and transmitted (transferred) to a designated destination such as a designated network directory physically located on the public network disk drive.

When the user on the client computer selects 600 a Windows or Dialog Box event which may require the user to access an external device, such as the "A:" drive or the CD-ROM drive (these events are all programmed in the client application), and if this event occurs then a polling sub-function is initialized 602 which initializes an operating system device status check on all external devices. This polling sub-function, queries each external device for a "drive ready" status every three seconds. If the "drive ready" status (standard C call) is true, the user will have inserted a floppy disk or a CD-ROM into the external "A:" drive or CD-ROM drive respectively.

If in fact, the user has inserted a floppy disk or CD-ROM into one of the external devices the polling function creates 604 an ASC command signal file and transmits (transfers) 606 the ASC command signal file to a designated location such as a network directory located on the public network disk drive.

This ASC command signal file which has been transferred to the public network disk drive is then processed 608 by the administrative application and is recorded in the administrative application as the current external device accessed by the user of a computer unit having the client application.

Figure 8:
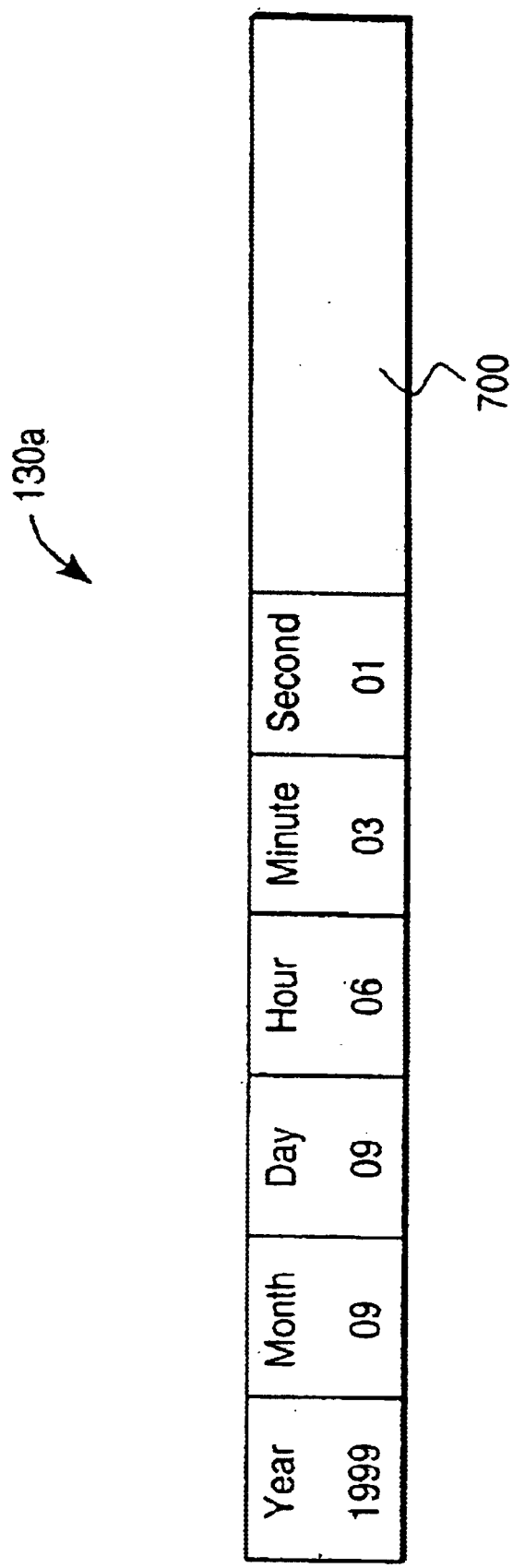
FIG. 8 is a diagram of a format of a Windows frame and dialog box ASC command signal file communications as the file is created and processed (transmitted) through the network.

Reference is now made to the block diagram in FIG. 8 for purposes of describing the format of an ASC command signal file 130a containing information of the Windows frame and/or dialog box activity by a user of a computer unit in the network system 100. As the initial parallel thread (polling routine) records the top priority of the "Z" order Windows frame or dialog box listing, the ASC command signal file 130a is written to a designated network directory physically located on the public network disk drive. In the example of FIG. 1, this designated network directory is located in storage device 120. The internal contents of the ASC command signal file 130a contain the year (including century), month (two digit, zero filled), day (two digit, zero filled), hour (military, two digit, zero filled), minute (two digit, zero filled), second (two digit, zero filled), and a field 700 containing information on the virtual memory character buffer of the active Windows frame or dialog box. The Windows frame or dialog box field 700a may be of variable length, for example, up to approximately 300 characters long.

The ASC command signal file 130a is then processed by the administrative application for viewing, storing and further analysis.

Reference is now made to the block diagram in FIG. 9 for purposes of describing the format of an ASC command signal file 130b containing information of the keyboard input activity by a user of a computer unit in the network system 100. The parallel thread (polling routine) monitors an independent Non-MFC dynamic link library ".dll" API and the keyboard virtual memory character buffer and transmits a keyboard ASC command signal file 130b to a designated location such as a designated network directory physically located on the public network disk drive. The internal contents of the file contain the year (including century), month (two digit, zero filled), day (two digit, zero filled), hour (military, two digit, zero filled), minute (two digit, zero filled), second (two digit, zero filled), and a field 720 containing information of characters within the current active keyboard buffer. The keyboard buffer field 720 is variable in length up to, for example, approximately 100 characters long.

The ASC signal file 130b is then processed by the administrative application for viewing, storing and further analysis.

Figure 10:
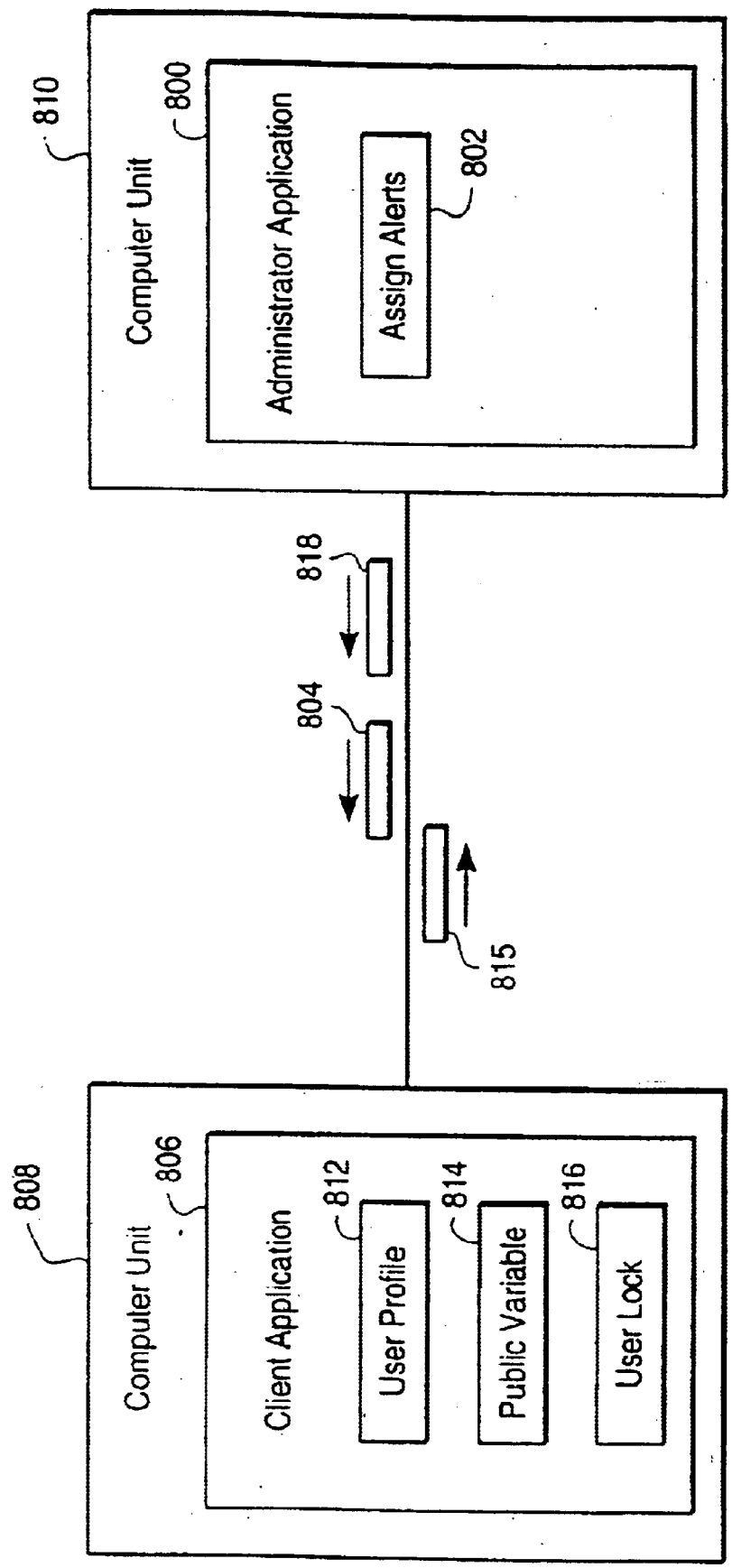
FIG. 10 is a functional block diagram illustrating a system of the present invention including a user environment (user profile) ASC command signal file as the file is created and processed (transmitted) through the network and controls and monitors company-owned computers.

Reference is now made to the functional block diagram in FIG. 10 for purposes of discussing additional features of the client application in accordance with an embodiment of the present invention. In one embodiment, the administrator application 800 includes a sub-system called "Assign Alerts" 802, which allows a user (of administrator application 800) to set up a series of parameters, which are stored in an ASC signal communications file 804 and transmitted (transferred) to a client application 806. These parameters automatically controls the entire user environment of the computer unit 808, as described below in additional details. These parameters, which are written and stored in an ASC command signal file 804, can be retried, modified or transmitted (transferred) to the user computer unit 808 at any time. The ASC command signal file 804 can also be transmitted to other computer units connected in the same network system as computer unit 810 and having a client application 806 in accordance with the present invention.

The mechanics of the administrator Assign Alerts sub-system 802 allows a user (of administrator application 800) to select and create a series of conditions (parameters) called "Alert Conditions", which include, for example, "Windows Access", "Web Site Access", "File Access", "Directory Access", "Floppy Drive Access", "CD-ROM", "Detached File Mode" and "Key Words". For example, if the Alert Condition of "Windows Access" is selected, an Alert Condition will occur if a user of computer unit 808 access the Windows program.

The next condition (parameter) that a user (of administrator application 800) can select is called an "Alert Type", which consists of a "Notification" or "Shut Down" parameter. These two types of conditions are described in detail in the example below.

The final condition (parameter) that the user (of administrator application 800) can select is the "Exact Description" parameter. This parameter requires the user to enter an exact description of the Windows frame and/or dialog event (e.g., Run, MS-DOS Prompt, Create Shortcut, and other events), keyboard event (word) or device event ("A:") which will be assigned to the Alert Type and the Alert Condition.

Figure 12:
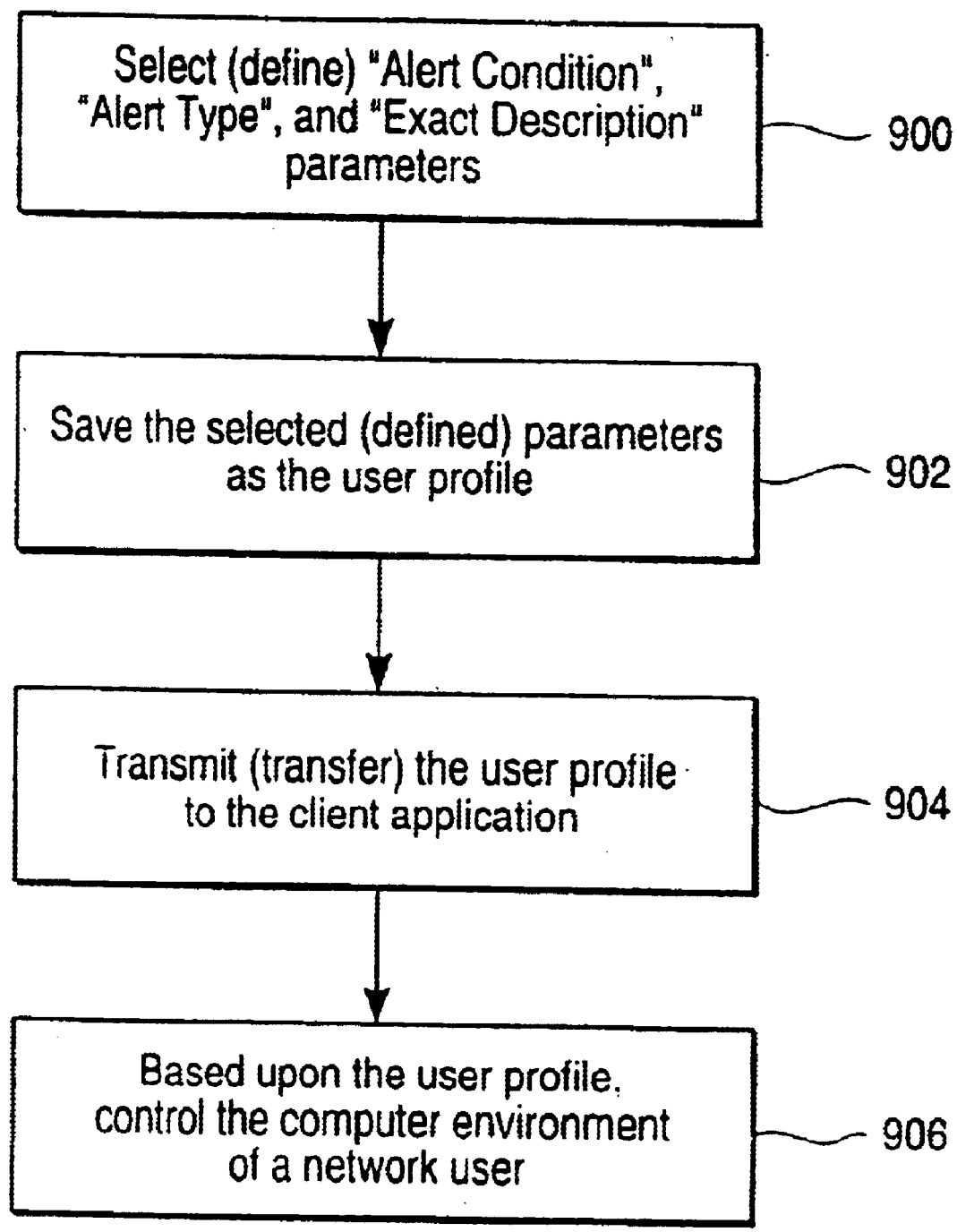
FIG. 12 is a flowchart diagram illustrating a method of creating a user profile in accordance with an embodiment of the present invention.

Reference is now made to the flowchart diagram of FIG. 12 as an example for creating a user profile. To create a user profile, the administrator would access the Assign Alerts sub-system and select (or define) 900 an entry from each of the three conditions. In other words, the user would choose an Alert Condition, choose an Alert Type, and define (write) the Exact Description parameter. Once the user has entered (or selected) data for all three fields, the administrator would SAVE 902 the data as the user profile. This user profile could then be automatically transmitted (transferred) 904 to the client application by choosing the SEND option. The user profile permits the client application to control 906 the computer environment of a user of a computer in the network system.

The Assign Alerts sub-system 802 allows the user (of administrator application 800) to establish a Global profile which can be assigned to all network users automatically, and an Individual profile which allows the administrator application user to select a single user on the network and modify his or her particular user environment (profile). The Global Profile option allows the user (of the administrator application) to define a single user profile, which can be automatically written to all of the user profile directories (client applications), which then transmit ASC command signals to the administrative application. Individual user profile's can be modified by accessing each individual user profile sub-system.

Once the Assign Alerts sub-system 802 has transmitted (transferred) the ASC command signal file 804 to a designated network directory that is physically located on the public network drive, the ASC command signal file 804 is received and processed by the client application 806. Once processed by the client application 806, this ASC command signal file 804 is utilized to filter all user activity for alert conditions and is referred to as a "user profile" 812.

Once the user profile 812 is active within the client application 806, each event initiated by the user (of computer unit 808) is filtered and checked in a real-time environment through the user profile 812. All Windows frame, dialog box, keyboard input and device access activities are filtered through a series of parallel threads (polling functions) which continuously cycle from, for example, approximately 0.150 to 0.250 seconds, to check for a possible Alert Condition based on the computer unit 808 user's action (event).

If the parallel threads, which continuously checks the user environment, identify an Alert Condition, a public variable (value) 814, which controls the "trigger" to generating a real-time ASC command signal file 815 (alert condition violation) and the initialization of a user lock application 816, is set to TRUE. When this parameter 814 is set to TRUE, it sets a parameter within the main parallel thread to initialize a sequence which transmits the ASC command signal file 815 and initializes the user lock application 816 to halt all user activity in computer unit 808.

The user lock application 816 is initialized by an internal "shell sequence" initiated by the client application 806. The "shell sequence", is a "C" method of starting another internal ".exe" executable application. This particular application is an automated application which has been designed to react to certain ASC command file signals received by the client application.

The user lock application 816 immediately initiates a dialog box routine, which has no Windows title, covers the entire computer screen, and cannot be moved or canceled by the user on the computer unit 808. This user lock application, is designed cover the entire computer screen and not allow the user to access any current applications accessible by using the mouse. This is the definition, for example, of the EVT User Lock from Evolutionary Vision Technology, Inc., San Antonio, Fla., wherein no applications can be accessed, the keyboard is useless, because the focus is constantly re-set to the EVT User Lock screen (application).

The EVT lock application can only be deactivated by receiving an ASC command signal file from the client application, which in turn, must receive an ASC command signal file from the administrative application.

Once the above dialog box routine has occurred, the computer unit 808 is now in a "User Lock" mode. The computer unit 808 can only be unlocked by accessing the Assign Alerts sub-system 802 in administrative application 800 and by sending a special ASC command signal file 818 to the computer unit 808 (and client application 806) to "unlock" the computer unit 808.

Once the "unlock" ASC command signal file 818 is sent to the client application 806, the client application resets the public variable 814 that controls the "trigger" to FALSE. When this public variable 814 is set to FALSE, this parameter initializes a sub function within the main parallel thread to initialize a sequence which transmits a "shut down" ASC command signal file to the user lock application 816. When this "shut down" ASC command signal file is received by the user lock application 816, this "shut down" ACS command signal file initializes a sub-function which posts a Windows "QUIT" message to the user lock application 816. As a result, the user lock application 816 is terminated and the computer unit 808 screen clears. The user can then return to normal activity in the computer unit 808.

Figure 11:
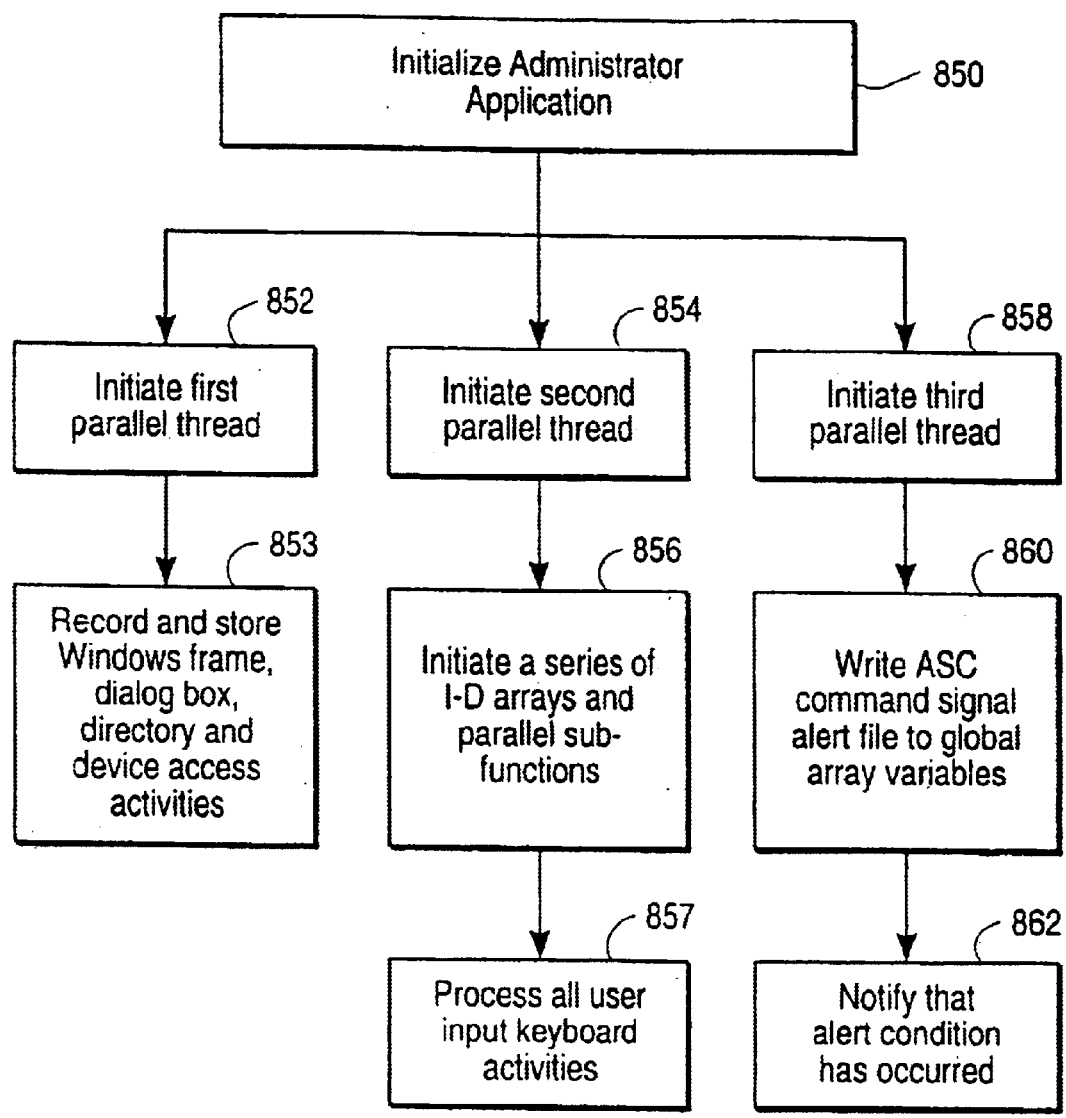
FIG. 11 is a flowchart diagram illustrating the functionality of the administrator application in accordance with an embodiment of the present invention.

Reference is now made to the flowchart diagram in FIG. 11 for purposes of describing the functionality of the administrator application in accordance with the present invention. The administrator application consists of a series of parallel threads (polling processes), which processes incoming ASC command signal files 130 from, for example, a defined directory that exists on a physical network drive.

The administrator application can be referred to as a "high speed signaling" engine. Upon the initialization 850 of the administrative application, a series of parallel threads (polling processes) are initiated which consistently poll at, for example, approximately 0.200 seconds for ASC command signal files which may exist within a defined directory located on a physical network drive.

A first parallel thread is initiated 852 and seeks all ASC command signal files that control all network user access to Windows frames, dialog boxes, files, directories and all devices accesses by the user. This parallel thread identifies the particular ASC command signal file by its file prefix and suffix. The file prefix contains the user name as defined within the client application on the network computer unit. The file suffix of ".svr" is utilized to monitor all generated ASC command signal files which pertain to Windows frame, dialog box, file, directory and device access activity.

The first parallel thread processes and monitors the above activities, and has a series of public variables that records 853 and stores a measured value of each network users Windows frame, dialog box, file, directory and device access activities.

A second parallel thread (polling process) is initiated 854 and seeks all ASC command signal files that control all network user keyboard input. The second parallel thread seeks all ASC command signal files that control all user keyboard activity. This second parallel thread identifies the command signal file by its file prefix and suffix. The file prefix contains the user name as defined within the client application on the network computer unit. The file suffix of ".kbd" is utilized to monitor all ASC command signal files generated which pertain to user keyboard input.

Based on the high volume of keyboard input signal traffic, this second parallel thread initiates 856 a series of one dimensional arrays which maintain and control a memory listing of all keyboard input files currently being processed by the parallel thread. To manage the processing of all keyboard files, the parallel thread initializes a series of parallel sub-functions, (20 sub-functions). These sub-functions execute within a parallel environment to process 857 all user input keyboard activities. Each of these parallel sub-function processors has the capability of processing up to 36 keyboard ASC command signal files per second. During high traffic volume, the main parallel thread which controls the processing of keyboard input ASC command files can processing over 700 ASC command signal files per second.

A third parallel thread is initiated 855 and processes all user ASC command signal file alert conditions that are received from each client application (and computer unit) within the network environment. This third parallel thread identifies the ASC command signal file by its file prefix and suffix. The file prefix contains the user name as defined within the client application on the network computer unit. The file suffix of ".not" is utilized to monitor all ASC command signal files generated which pertain to alert notifications.

Each ASC command signal alert file received and processed by the alert notification thread is written 860 to a series of global array variables which populate a screen object, thus notifying 862 the user of the administrative application that a real-time user alert condition has occurred.

The present invention permits the tracking of Windows Frame and dialog box activity, for example, in the following operating systems: Windows 95 (including all software release and version upgrades); Windows 98 (including all software release and version upgrades); Windows NT Work Station (including all software release and version upgrades); Windows NT Server (including all software release and version upgrades); Windows 2000 Work Station (including all software release and version upgrades); Windows 2000 Server (including all software release and version upgrades).

It is within the scope of the present invention to implement a program or code that can be stored in an electronically-readable medium or a computer-readable medium to permit a computer to perform the methods described above.

Thus, while the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

What is claimed is:

1. A method of transferring in real-time a user profile from an administrator computer unit to a client computer unit in a network, the method comprising the steps for:

selecting a plurality of parameters to define a user profile for controlling the computer environment of a user of the client computer unit, the parameters including at least one of an alert condition, an alert type, and a description of an event;

formatting the user profile into an ASC command signal file; and transferring the user profile from administrator computer unit to the client computer unit over the network to control the computer environment of the user of the client computer unit, the user profile initiating a user lock application stored in the client computer unit to halt user activity in the client computer unit without additional action taken by the administrator computer unit if the activity of the user violates the user profile.

2. An electronically-readable medium storing a program for permitting a computer to perform a method of transferring in real-time a user profile from an administrator computer unit to a client computer unit in a network, the method comprising the steps for:

selecting a plurality of parameters to define a user profile for controlling the computer environment of a user of the client computer unit, the parameters including at least one of an alert condition, an alert type, and a description of an event;

formatting the user profile into an ASC command signal file; and transferring the user profile from the administrator computer unit to the client computer unit over the network to control the computer environment of the user of the client computer unit, the user profile initiating a user lock application stored in the client computer unit to halt user activity in the client computer unit without additional action taken by the administrator computer unit if the activity of the user violates the user profile.

3. A method of controlling in real time access to an external device coupled to a client computer unit in a network, the method comprising the steps for:

providing a user profile from an administrator computer unit to a client application in the client computer unit over the network, the user profile formatted into an ASC command signal file and defining the computer environment of a user of the client computer unit and the client application including a user lock application; and based upon am activity of the user and the user profile, the user profile initiating the user lock application to halt user activity in the client computer unit without additional action taken by the administrator computer unit if the activity of the user violates the user profile.

4. An electronically-readable medium storing a program for permitting a computer to perform a method of controlling in real time access to an external device coupled to a client computer unit in a network, the method comprising the steps for:

providing a user profile from an administrator computer unit to a client application in the client computer unit over the network, the user profile formatted into an ASC command signal file and defining the computer environment of a user of the client computer unit and the client application including a user lock application; and based upon an activity of the user and the user profile, the user profile initiating the user lock application to halt user activity in the client computer unit without additional action taken by the administrator computer unit if the activity of the user violates the user profile.

5. A method of halting in real time the user environment of a client computer unit in a network, the method comprising the steps for:

providing a user profile from an administrator computer unit to a client application in the client computer unit over the network, the user profile formatted into an ASC command signal file and defining the computer environment of a user of the client computer unit and the client application including a user lock application; and the user profile initiating the user lock application to halt user activity in the client computer unit without additional action taken by the administrator computer unit if the activity of the user violates tie user profile.

6. An electronically-readable medium storing a program for permitting a computer to perform a method of halting in real time the user environment of a client computer unit in a network, the method comprising the steps for:

providing a user profile from art administrator computer unit to a client application in the client computer unit over the network, the user profile formatted into an ASC command signal file and defining the computer environment of a user of the client computer unit and the client application including a user lock application; and the user profile initiating the user lock application to halt user activity in the client computer unit without additional action taken by the administrator computer unit if the activity of the user violates the user profile.

* * * * *

UNITED STATES PATENT AND TRADEMARK OFFICE
CERTIFICATE OF CORRECTION

PATENT NO. : 6,708,211 B1 Page 1 of 1
DATED : March 16, 2004
INVENTOR(S) : Margie A. Tingley and Robert F. Terry It is certified that error appears in the above-identified patent and that said Letters Patent is hereby corrected as shown below:

Column 13,
Line 39, insert -- the -- after "profile from".

Column 14,
Line 11, change "am" to -- an --.
Line 46, change "tie" to -- the --.
Line 51, change "art" to -- an --.

Signed and Sealed this

Eighteenth Day of October, 2005

JON W. DUDAS
*Director of the United States Patent and Trademark Office*